(12) United States Patent
Dhong et al.

(10) Patent No.: US 6,393,446 B1
(45) Date of Patent: May 21, 2002

(54) 32-BIT AND 64-BIT DUAL MODE ROTATOR

(75) Inventors: Sang Hoo Dhong; Hung Cai Ngo; Jaehong Park, all of Austin, TX (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,450

(22) Filed: Jun. 30, 1999

(51) Int. Cl.[7] .................................................. G06F 7/00
(52) U.S. Cl. ...................................................... 708/209
(58) Field of Search ............................. 708/209; 377/64, 377/69, 70, 73, 75

(56) References Cited

U.S. PATENT DOCUMENTS

| | | | |
|---|---|---|---|
| 4,472,788 A | * 9/1984 | Yamazaki | .............. 708/209 |
| 5,231,636 A | 7/1993 | Rasmussen | |
| 5,553,010 A | * 9/1996 | Tanihira et al. | ............. 708/209 |
| 5,671,166 A | * 9/1997 | Omote | .............. 708/209 |
| 5,751,614 A | 5/1998 | Cohen | |
| 5,773,995 A | 6/1998 | Crocker | |
| 5,781,457 A | 7/1998 | Cohen et al. | |
| 5,802,556 A | 9/1998 | Patel et al. | |
| 5,809,320 A | 9/1998 | Jain et al. | |
| 5,819,056 A | 10/1998 | Favor | |
| 5,991,786 A | * 11/1999 | Mahurin | .............. 708/209 |

* cited by examiner

*Primary Examiner*—Chuong Dinh Ngo
(74) *Attorney, Agent, or Firm*—Duke W. Yee; Casimer K. Salys; Stephen R. Loe

(57) ABSTRACT

A dual mode rotator capable of performing 32-bit and 64-bit rotation. According to a preferred embodiment, the dual mode rotator includes a first, second, and third rotator units wherein each rotator has a plurality of inputs and outputs. The inputs of the second rotator are operatively connected to the corresponding outputs of the first rotator unit. The inputs of the third rotator unit are operatively connected to the corresponding outputs of the second rotator. Responsive to selection of 32-bit rotation mode, the upper half of the inputs to the first rotator are zero and the lower half of the outputs of the third rotator are replicated in the upper half of the outputs of the third rotator.

19 Claims, 5 Drawing Sheets

32-BIT AND 64-BIT DUAL MODE ROTATOR

BACKGROUND OF THE INVENTION

1. Technical Field

The present invention relates to the field of microprocessors and more particularly, relates to a method and apparatus for rotate circuit.

2. Description of Related Art

It is well known in the data processing art to provide data processing systems with means for rotating multi-bit binary data. Rotation of data is typically used in data field manipulation operations such as field extraction, insertion, or data alignment. For example, use of a rotator for data alignment is described below.

Current microprocessors typically employ cache memory to improve the operating performance of the microprocessor. Both data and instructions are cached in many modern microprocessor designs. Such caching techniques are well known in the art. However, one problem frequently encountered in cached processor designs is data misalignment.

Cache memory is generally arranged in blocks, or lines, consisting of several bytes of memory. For example, in the exemplary IBM "PowerPC" architecture, each cache block consists of two words, each word consisting of four bytes, for a total of 8 bytes per block. Each word of each block is individually addressable.

FIG. 1 shows an example of a cache 100 that is n bytes wide. Cache 100 includes blocks 0 and 1, each consisting of words 0 and 1. Word 0 of block 0 consists of bytes 0–3, word 1 consists of bytes 4–7, word 0 of block 1 consists of bytes 8-B, and word 1 consists of bytes C–F.

The execution of certain instructions can cause data in the cache to be misaligned as will be described with respect to FIG. 1. For example, on the execution of a load word instruction, address data from two general purpose registers ("GPRs") is added, and data is retrieved from the cache at the resulting address and stored into a third general purpose register. To illustrate how such an instruction can cause data in the cache to become misaligned, it is assumed that the load word instruction at issue requires two addresses stored in GPR 1 and GPR 2, respectively, to be summed and the data from the cache at the resulting address to be stored in GPR 3. If GPR 1 equals 0, and GPR 2 equals 1, then the word beginning at address 1 in block 0 of cache 100 will be written in GPR 3. As shown in FIG. 1, this word comprises bytes 1–4 which are stored partly in word 0 and partly in word 1. Thus, to store this word in GPR 3, two reads from cache 100 are required. In the first read, bytes 0–3 are retrieved from word 0. IN the second read, bytes 4–7 are retrieved from word 1. This data is then merged to form a single word comprising bytes 1–4, and stored in GPR 3. Of course, to properly merge the desired data from words 0 and 1, the relevant bytes must be aligned. Therefore an alignment circuit or rotator must be employed as is well known in the art.

Sometimes, 32-bit instructions must be performed on a 64-bit machine thus requiring a 64-bit rotator to perform 32-bit rotation. In some computer architectures, it is required that the higher order 32 bits of the 32-bit rotation result to have the same values as the lower order 32 bits. A common method to implement this requirement is that, when a 64-bit rotator does 32-bit rotation, 32-bit rotate data inputs are duplicated. That is, the 32-bit rotate data inputs are applied to the higher order 32 bits as well as to the lower order 32 bits, and rotated. However, this results in the increase of the data input load and/or penalty on the speed of the rotation. Therefore, a faster method of performing 32-bit rotation on a 64-bit machine with a lower data input load is desirable.

SUMMARY OF THE INVENTION

The present invention provides a dual mode rotator capable of performing 32-bit and 64-bit rotation. According to a preferred embodiment, the dual mode rotator includes a first, second, and third rotator units wherein each rotator has a plurality of inputs and outputs. The inputs of the second rotator are operatively connected to the corresponding outputs of the first rotator unit. The inputs of the third rotator unit are operatively connected to the corresponding outputs of the second rotator. Responsive to selection of 32-bit rotation mode, the upper half of the inputs to the first rotator are zero and the lower half of the outputs of the third rotator are replicated in the upper half of the outputs of the third rotator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
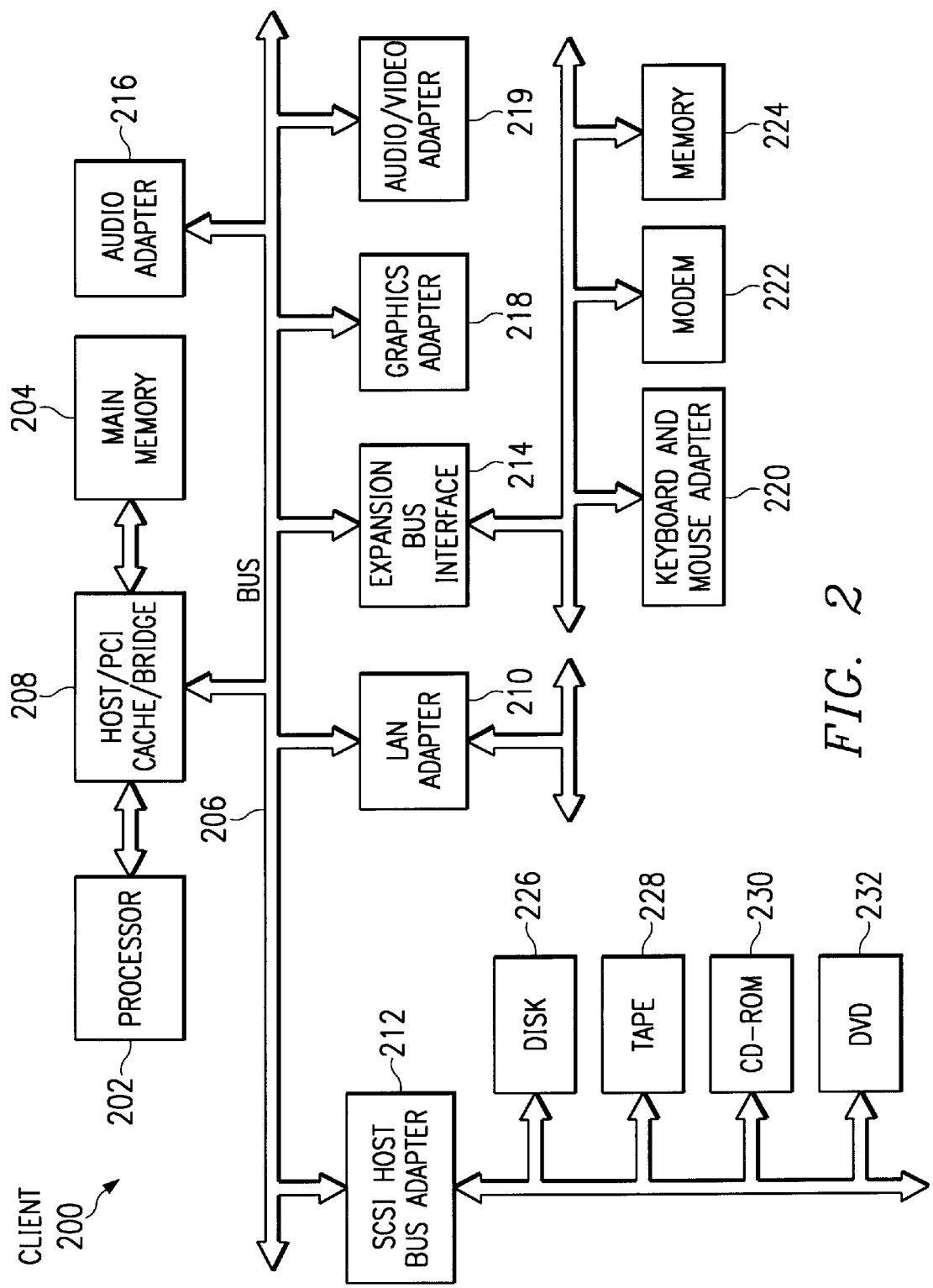
FIG. 2 depicts a block diagram of a data processing system.

With reference now to the figures, and in particular with reference to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
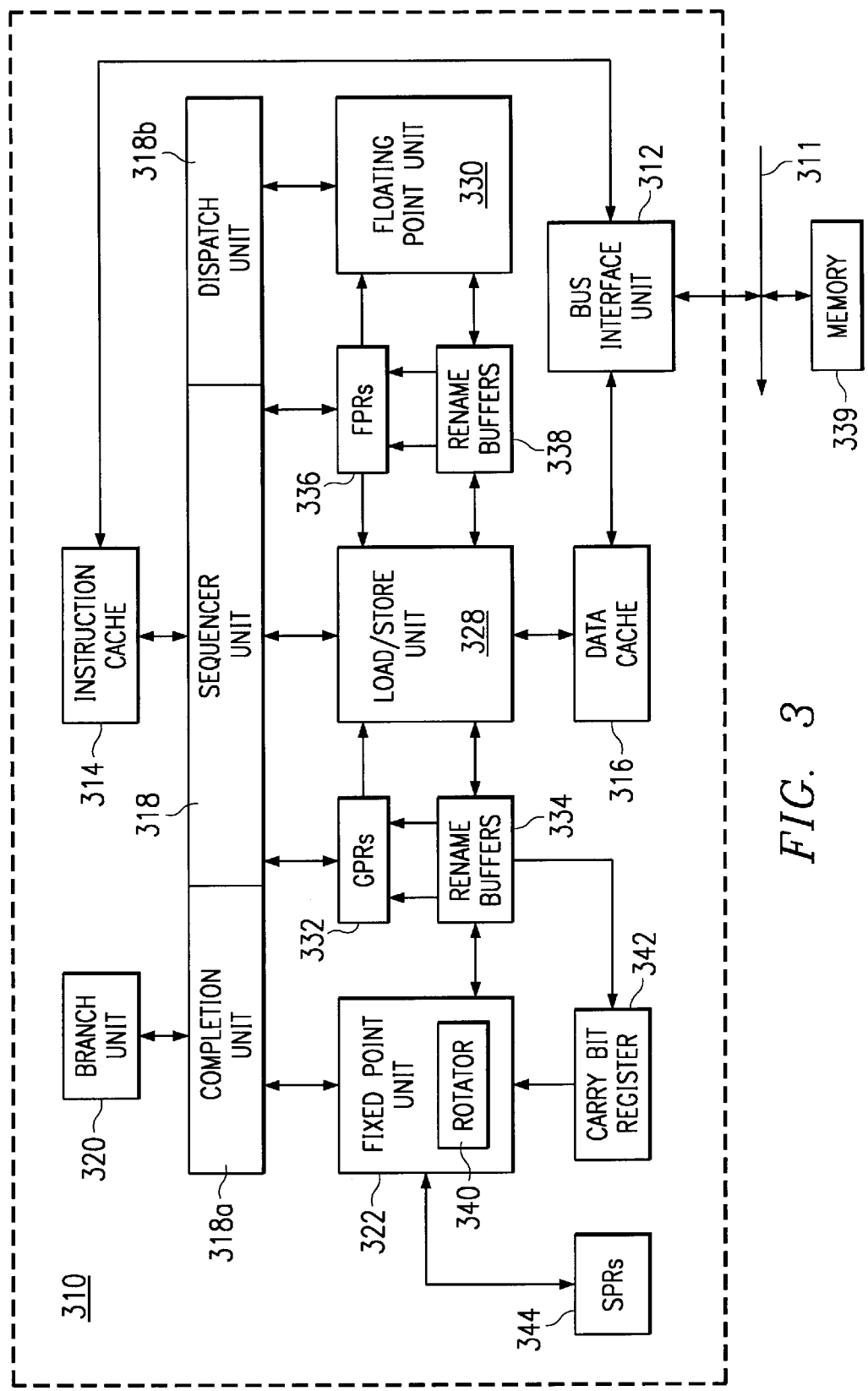
FIG. 3 is a block diagram of a processing unit in which the present invention may be implemented.

FIG. 3 is a block diagram of a processor 310 system for processing information which may be used as the processor for a computer such as processor 202. Processor 310 includes various units, registers, buffers, memories, and other sections, all of which are formed by integrated circuitry. As shown in FIG. 3, a system bus 311 is connected to a bus interface unit ("BIU") 312 of processor 310. BIU 312 controls the transfer of information between processor 310 and system bus 311.

BIU 312 is connected to an instruction cache 314 and to a data cache 316 of processor 310. Instruction cache 314 outputs instructions to a sequencer unit 318. In response to such instructions from instruction cache 314, sequencer unit 318 selectively outputs instructions to other execution circuitry of processor 310.

In addition to sequencer unit 318, the execution circuitry of processor 310 includes multiple execution units, namely a branch unit 320, a fixed point unit ("FXU") 322, a load/store unit ("LSU") 328 and a floating-point unit ("FPU") 330. FXU 322 and LSU 328 input their source operand information from general purpose architectural registers ("GPRs") 332 and fixed point rename buffers 334. Moreover, FXU 322 inputs a "carry bit" from a carry bit ("CA") register 342. FXU 322 and LSU 328 output results (destination operand information) of their operations for storage at selected entries in fixed point rename buffers 334. Also, FXU 322 inputs and outputs source operand information and destination operand information to and from special purpose registers ("SPRs") 344. Also, FXU 322 includes a rotator 340 for aligning misaligned bits.

FPU 330 inputs its source operand information from floating-point architectural registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 339 connected to system bus 311. Moreover, data cache 316 is able to output (through BIU 312 and system bus 311) information from data cache 316 to system memory 339 connected to system bus 311. In response to a Store instruction, LSU 328 inputs information from a selected one of GPRs 332 and FPRs 336 and copies such information to data cache 316.

Sequencer unit 318 includes completion unit 318a and dispatch unit 318b. The dispatch unit 318b provides the logic for decoding instructions and issuing them to the appropriate execution units. A reorder buffer entry is allocated for each instruction, and dependency checking is done between the instructions in a dispatch queue. The rename buffers are searched for the operands as the operands are fetched from the register file. Operands that are written by other instructions ahead of the one in the dispatch queue are given the tag of that instruction's rename buffer; otherwise, the rename buffer or register file supplies either the operand or a tag. AS instructions are dispatched, a fetch unit is notified that the dispatch queue can be updated with more instructions.

Completion unit 318a retires executed instructions from the reorder buffer and recognizes exception conditions and discards any operations being performed on subsequent instructions in program order. The instruction is retired from the reorder buffer when it has finished execution and all instructions ahead of it have been completed. The instruction's result is written into the appropriate register file and is removed from the rename buffers at, or after completion. At completion, other resources affected by this instruction are updated.

When dispatch unit 318b dispatches an instruction to an execution unit, the instruction, along with tags representing the instruction number, the target rename buffer, and the operand source, is simultaneously dispatched to the completion unit 318a. The completion unit 318a maintains the order in which the instructions are dispatched in a first-in first-out ("FIFO") buffer. Completion unit 318a monitors the valid bits associated with the rename registers. When an execution unit sets a valid bit of a rename register to indicate that the rename register contains valid information, the corresponding instruction in the FIFO buffer of the completion unit is marked as finished. If there are no unfinished instructions ahead of the finished instruction in the FIFO buffer, then the completion unit 318a writes the result of the finished instruction back to the architectural registers. If there are unfinished instructions ahead of the finished instruction, then the completion unit 318a waits until they are also finished before writeback to the architectural registers is performed. This prevents writing erroneous data to the architectural registers if one of the unfinished instruction results in an exception.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 339 connected to system bus 311.

In the response to the instructions input from instruction cache 314, sequencer unit 318 selectively dispatches the instructions to selected ones of execution units 320, 322, 328, and 330. Each execution unit executes one or more instructions of a particular class of instructions. For example, FXU 322 execute a first class of fixed point mathematical operations on source operands, such as addition, subtraction, ANDing, ORing and XORing. FXU 322 also executes a second class of fixed point operations on source operands, such as fixed point multiplication and division. FPU 330 executes floating-point operations on source operands, such as floating-point multiplication and division.

As information is stored at a selected one of rename buffers 334, such information is associated with a storage location (e.g. one of GPRs 332 or CA register 342) as specified by the instruction for which the selected rename buffer is allocated. Information stored at a selected one of rename buffers 334 is copied to its associated one of GPRs 332 (or CA register 342) in response to signals from sequencer unit 318. Sequencer unit 318 directs such copying of information stored at a selected one of rename buffers 334 in response to "completing" the instruction that generated the information. Such copying is called "writeback".

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

It should be noted that processor 310 is given merely as an example of a processor in which the present invention may be implemented. Furthermore other processors in which the present invention may be implemented may include more or fewer components than are illustrated in processor 310 and the rotator 340 may be arranged differently depending on the particular requirements of the system as well be obvious to those skilled in the art.

Figure 1:
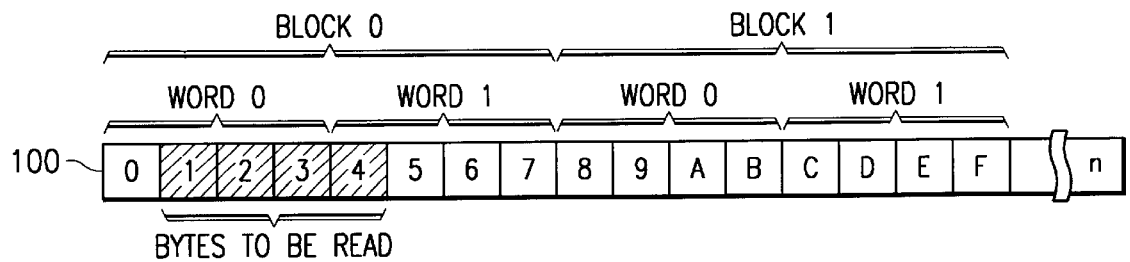
FIG. 1 is a block diagram of a conventional cache memory.
Figure 4:
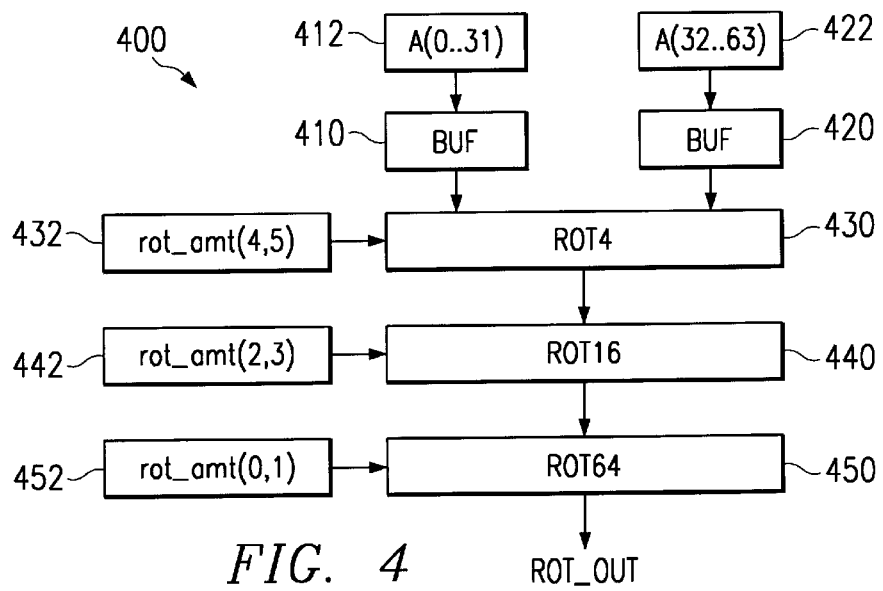
FIG. 4 depicts a conventional 64-bit rotator.

Turning now to FIG. 4 there is shown a block diagram of a conventional 4-way merge 64-bit rotator 400. Rotator 400 consists of three rotation units, ROT4 430, ROT16 440, and ROT64 450, for performing a four-way merge. Typically the three rotation units 430, 440, and 450 are 4:1 dynamic gate digital multiplexers.

Rotator unit ("ROT4") 430 accepts as a merged input a merge of the upper 32 bits 412 and the lower 32 bits 422 of a registry containing the data to be rotated. As shown, the upper 32 bits 412 and the lower 32 bits 422 pass through buffers 410 and 420 prior to being input into ROT4 430. However, the buffers 410 and 420 are optional. The buffers 410 and 420 ensure that the data from the upper 32 bits 412 and the lower 32 bits 422 of the registry arrive at ROT4 430 fast if they have drive long wires. The ROT4 430 rotates the 64-bit merged input by 0, 1, 2, or 3 bits. The particular amount is determined by the select input ("rot_amt(4,5)") 432. Rot_amt(4,5) 432 is the last two bits of the total rotation amount. Thus, if the total 64-bit rotation amount is 5 bits which corresponds to a binary number of 000101, then the last two bits are 01. Thus, ROT4 430 would rotate the merged input by 1 bit.

The output from ROT4 430 is the input for rotator unit ("ROT16") 440 which rotates the output from ROT4 430 by 0, 4, 8, or 12 bits. Again, the particular amount is determined by the select input ("rot_amt(2,3)") 442. Rot_amt(2,3) 442 is the middle two bits of the total rotation amount. Thus, if the total 64-bit rotation amount is 5 bits, rot_amt(2,3) is 01. Therefore, the output of ROT4 430 would be rotated by 4 bits in the present case.

The output from ROT16 440 is the input to rotation unit ("ROT64") 450. ROT64 450 rotates the output of ROT16 440 by 0, 16, 32, or 48 bits. The particular amount is determined by select input ("rot_amt(0,1)") 452. Rot_amt (0,1) is the first two bits of the total 64-bit rotation amount. Output ("ROT_OUT") is the resulting rotated output rotated by the appropriate amount. Again, going back to our example of rotating by 5 bits, rot_amt(0,1) would be 00. Therefore, in the case of 5 bit rotation, ROT64 450 would rotate the output from ROT16 440 by 0 bits. Thus, the total rotation performed by rotator 400 would be 5 bits, 1 bit from ROT4 430 and 4 bits from ROT16 440.

Figure 5:
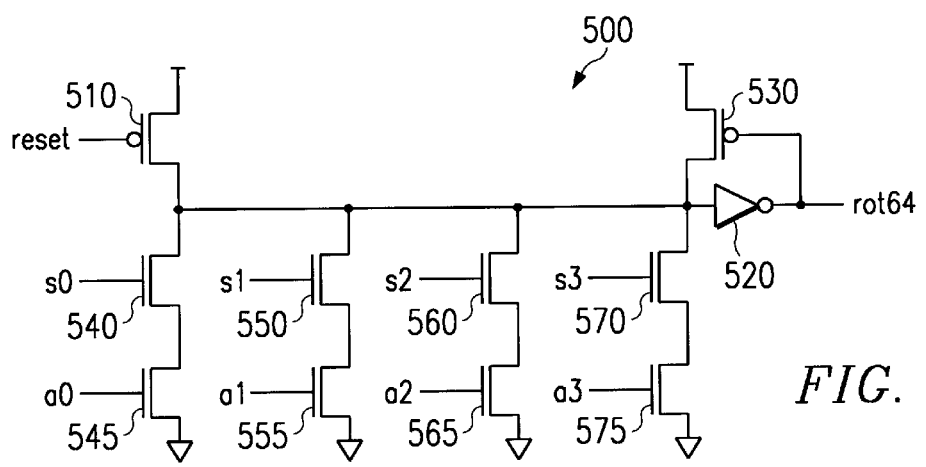
FIG. 5 is an illustration of an example of a circuit appropriate for performing the functions of ROT4, ROT16 and ROT64.

An example of a circuit 500 appropriate for performing the functions of ROT4 430, ROT16 440, and ROT64 450 is illustrated in FIG. 5. Each of the rotation units 430, 440, and 450 would contain 64 such circuits; one for each bit of the 64-bit input. Circuit 500 is identical for each of rotation units 430, 440, and 450 except that the select inputs and data inputs are different.

A pMOS transistor 510 is gated by a reset signal. Transistor 510 is connected to the input of inverter 520, to the drain of pMOS transistor 530, and to the drains of nMOS transistors 540, 550, 560, and 570. Transistor 530 is gated by the output of inverter 520, which is the rotated result. Transistor 540 is gated by select signal S0. Transistor 550 is gated by select signal S1. Transistor 560 is gated by select signal S2. Transistor 570 is gated by select signal S3.

The source of transistor 540 is connected to the drain of transistor 545. The source of transistor 545 is connected to ground and the gate of transistor 545 is connected to data input a0.

The source of transistor 550 is connected to the drain of transistor 555. The source of transistor 555 is connected to ground and the gate of transistor 555 is connected to data input a1.

The source of transistor 560 is connected to the drain of transistor 565. The source of transistor 565 is connected to ground and the gate of transistor 565 is connected to data input a2.

The source of transistor 570 is connected to the drain of transistor 575. The source of transistor 575 is connected to ground and the gate of transistor 575 is connected to data input a3.

For ROT4 430, the data inputs a0, a1, a2, and a3 for the circuit performing rotation on the $i^{th}$ data bit are the i, i+1, i+2, and i+3 data bits and the select signals s0, s1, s2, and s3 are determined from rot_amt(4,5).

For ROT16 440, the data inputs a0, a1, a2, and a3 for the circuit performing rotation on the $i^{th}$ data bit are the i, i+4, i+8, and i+12 data bits and the select signals s0, s1, s2, and s3 are determined from rot_amt(2,3).

For ROT64 450, the data inputs a0, a1, a2, and a3 for the circuit performing rotation on the $i^{th}$ data bit are the i, i+16, i+32, and i+48 data bits and the select signals s0, s1, s2, and s3 are determined from rot_amt(0,1).

Only one of s0, s1, s2, and s3 will be 1 for any one of circuit 500 64-bit rotation.

In some computer architectures, if it is desired to perform 32-bit rotation on a 64-bit machine, the higher order 32 bits of the rotation result are required to have the same values as the lower order 32-bits. A common method to implement this requirement is that when a 64-bit rotator performs 32-bit rotation, 32-bit rotate data inputs are duplicated, applied to higher order 32 bits as well as lower order 32 bits, and rotated.

Figure 6:
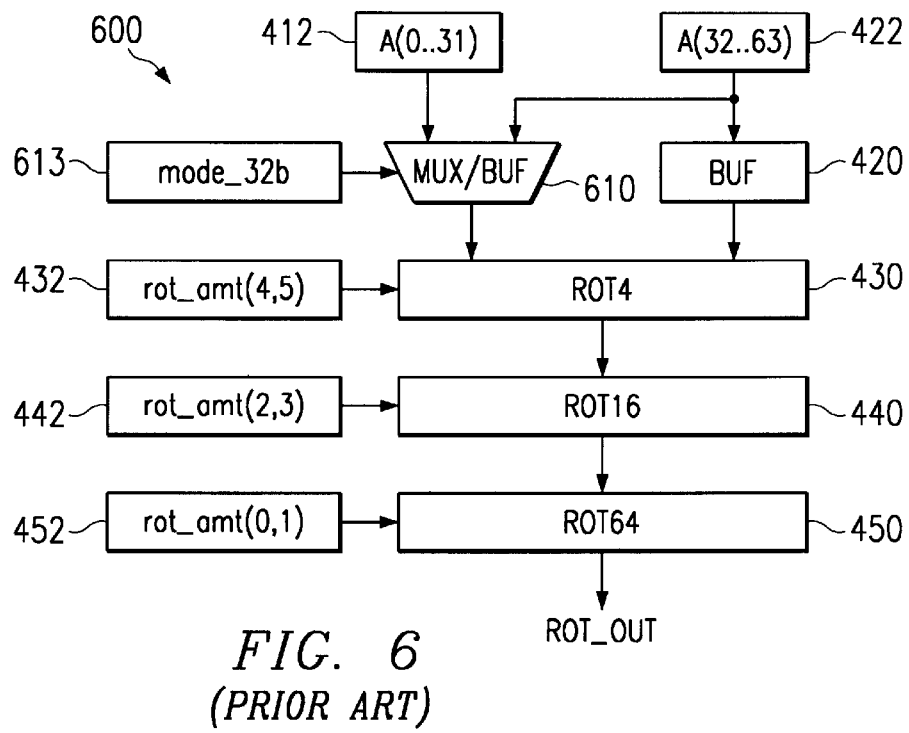
FIG. 6 depicts a prior art version of performing 32-bit rotation on a 64-bit rotator.

Turning now to FIG. 6, there is shown a block diagram of a prior art 64-bit rotator 600 capable of performing 32-bit rotation by duplicating data inputs for 32-bit rotation. The upper 32-bit registry of row 1 is determined MUX/BUF 610 which is a two to one digital multiplexer with optional buffer. The buffer is only necessary in the cases as discussed above. Rotator 600 performs in the same manner as rotator 400 except that, rather than having upper 32 bits of the input registry for ROT4 430 filled from upper 32 bits 412, the input is selected by MUX/BUF 610. MUX/BUF 610 allows the input to both the upper and lower registries for ROT4 430 to be identical by duplicating the input when rotator 600 is being used to perform 32-bit rotation.

MUX/BUF 610 has two data inputs 412 and 422 rather than one data input 412 as does buffer 410. Furthermore, MUX/BUF 610 has a select input, mode_32b 613. Mode_32b 613 determines whether 64-bit or 32-bit rotation will be performed. If mode_32b 613 is low, then the input to ROT4 430 is the same as for rotator 400 and rotator 600 performs 64-bit rotation in the same manner as rotator 400. However, if mode_32b 613 is high, then the output of MUX/BUF 610, which is the input for the upper 32 bits of ROT4 430, is the same as the input to the lower 32 bits of ROT4 430. Thus, the result of the rotation has identical results in the upper and lower registries. However, one problem with rotators such as rotator 600 is that the data input load is increased and additional logic circuits are needed to perform the operations of MUX/BUF 610, which decrease the performance of rotator 600.

Figure 7:
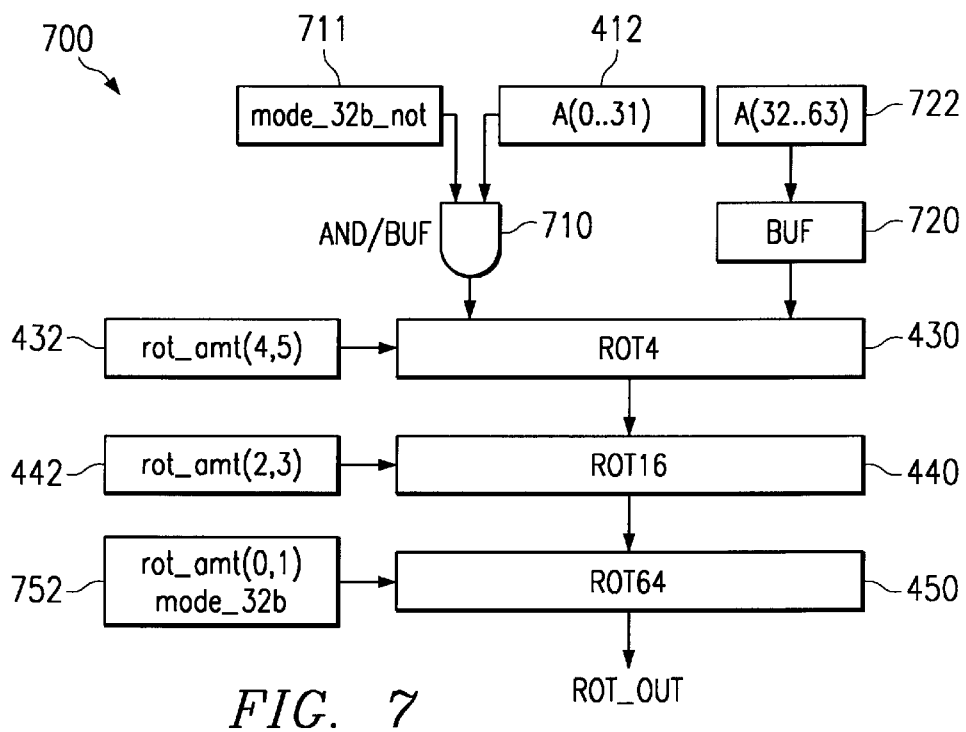
FIG. 7 depicts a 64-bit rotator in accordance with the present invention.

Turning now to FIG. 7, there is shown a block diagram of a 64-bit rotator 700 capable of performing 32-bit rotation according to the present invention. Rotator 700 has simpler logic circuits added to critical paths, and the data input load has not been increased. Thus, there is an increase in speed of performance of rotator 700 over rotator 600.

Rotator 700 is similar to rotator 600 except for two fundamental differences that allow rotator 700 to perform 32-bit rotation as well as 64-bit rotation. One fundamental difference is that the upper 32-bit registry for the input to ROT4 430 is determined by an ANDing unit AND/BUF 710 which may contain an optional buffer as well. The inputs for AND/BUF 710 are upper 32 bits 412 and mode_32b_not 711. If 32-bit rotation is selected, then mode_32b_not will be 0 and thus the result of performing an AND operation on mode_32b_not 711 with upper 32 bits 412 is 0 for all upper 32 bits 412. Thus, the input into the upper 32-bit registry of ROT4 430 is 0 for all 32 bits if 32-bit rotation is to be performed. However, there is no additional input load, as is the case with rotator 600, because the lower 32-bit input is not duplicated into the input of the upper registry.

If 64-bit rotation is to be performed, then mode_32b_not is 1 and the result of performing an AND operation on mode_32b_not 711 with upper 32 bits 412 is upper 32 bits 412. This gives the same input to ROT4 430 as is given with rotator 400. Thus, in this case, standard 64-bit rotation will be performed by rotator 700.

The other fundamental difference between rotator 700 and rotator 600 is the computation of rotate control signals for ROT64 450. Rotate control signals for ROT64 450 in rotator 700 are controlled by select signal unit 752 instead of select signal unit 452 as in rotator 600. The select signals s0, s1, s2, and s3 are computed from the zeroth and first rotation amount bits of the total rotation amount and from mode_32b which determines whether 32-bit or 64-bit rotation will be performed. Mode_32b is 1 if 32-bit rotation will be performed and is zero if 64-bit rotation will be performed. Select signals S0, S1, S2, and S3 are computed from the following equations:

$$S0=(\hat{\ }rot\_amt(0)+mode\_32b) \& \hat{\ }rot\_amt(1)$$

$$S1=(\hat{\ }rot\_amt(0)+mode\_32b) \& rot\_amt(1)$$

$$S2=(rot\_amt(0)+mode\_32b) \& \hat{\ }rot\_amt(1)$$

$$S3=(rot\_amt(0)+mode\_32b) \& rot\_amt(1)$$

where rot_amt(0) is the zeroth bit of the rotation amount, rot_amt(1) is the first bit of the rotation amount, and where ^rot_amt(0) and ^rot_amt(1) are the complements of rot_amt(0) and rot_amt(1) respectively. If mode_32b is zero, then one and only one of S0, S1, S2, and S3 will be one and the rest will be zero. If mode-32b is one, then two and exactly two of S0, S1, S2, and S3 will be one and the other two will be zero.

With rotate control signals 752 computed as above, the output of ROT64 450 is given by:

$$ROT64=(S0 \& ROT16\_0)+(S1 \& ROT16\_1)+(S2 \& ROT16\_2)+(S3 \& ROT16\_3)$$

ROT16$_{1 3}$0 is the $i^{th}$ bit, ROT16_1 is the $i^{th}$+16 bit, ROT16_2 is the $i^{th}$+32 bit, ROT16_3 is the $i^{th}$+48 bit from the output of ROT16 440. In 32-bit mode, ROT64 450 with the above computed select signals computes OR of two data bits from ROT16 such as:

$$ROT64(i)=ROT16(i)+ROT16((i+32)\%64),$$

where (i+32)%64 means the remainder of (i+32) divided by 64. Thus the upper 32 bits of the rotated result are identical to the lower 32 bits of the rotated result.

Figure 8:
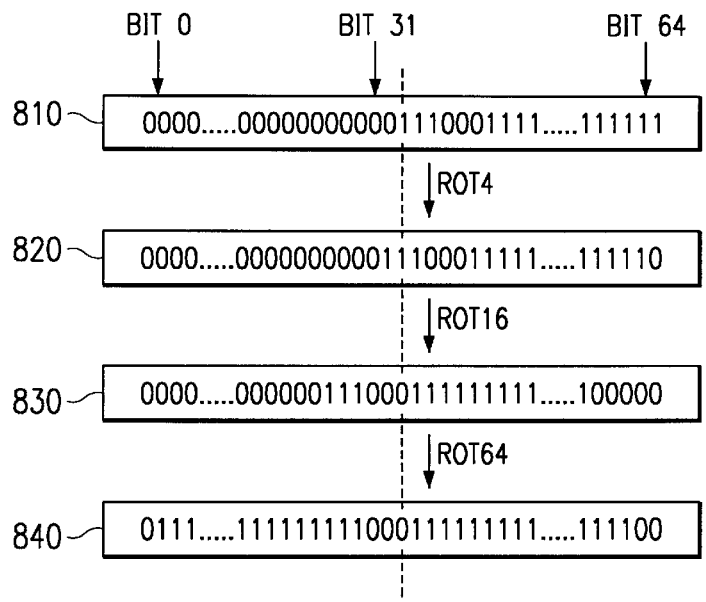
FIG. 8 illustrates the rotation of bits using the 64-bit rotator of FIG. 7.

An example of 32-bit rotation performed by 64-bit rotator 700 is shown in FIG. 8. In this example, it is desired to perform 32-bit rotation and rotate the input 810 to the left by 5 bits. Thus, the binary representation of the rotation amount is 000101 where rot_amt(4,5) 432 is 01, rot_amt(2,3) 442 is 01, rot_amt(1) is 0 and rot_amt(0) is also 0. The result of ROT4 430 is shown in block 820. The result of ROT16 440 is shown in block 830. The result of ROT64 450 is shown in block 840. Notice that bits 0 through 31 are identical to bits 31 through 64 in block 840.

Turning now to FIGS. 9A–9D, there are shown circuit diagrams for the logic that computes rotate control signals S0, S1, S2, and S3 for ROT64 450. Each circuit is identical except for the gate inputs and the output. The drain of pMOS transistor 910 is connected to the input of inverter 960, to the drain of pMOS transistor 950, and to the drain of nMOS transistor 920. The source of nMOS transistor 920 is connected to the drain of transistor 940 and to the drain of nMOS transistor 930. The source of transistor 930 is connected to ground as is the source of transistor 940. The output of inverter 960 is connected to the gate of transistor 950.

Figure 9A:
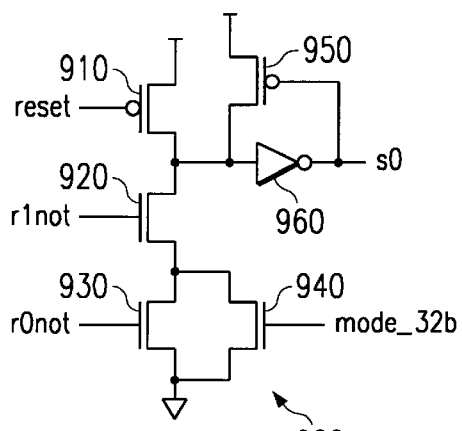
FIGS. 9A–9D depict circuits to provide the appropriate select signals for the circuit of FIG. 5.

Turning now to FIG. 9A, the circuit 900 that produces select signal S0 is shown. Transistor 910 is gated by a reset signal. Transistor 920 is gated by ^rot_amt(1). Transistor 930 is gated by ^rot_amt(0) and transistor 940 is gated by mode_32b. The output of circuit 900 is select signal S0.

Figure 9B:
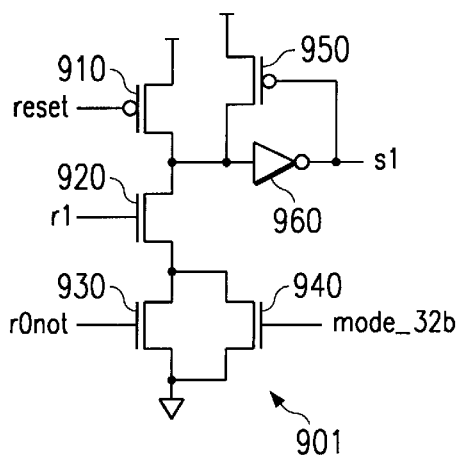

Turning now to FIG. 9B, the circuit 901 that produces select signal S1 is shown. Transistor 910 is gated by a reset signal. Transistor 920 is gated by rot_amt(1), transistor 930 is gated by ^rot_amt(0), and transistor 940 is gated by mode_32b. The output of circuit 901 is select signal S1.

Figure 9C:
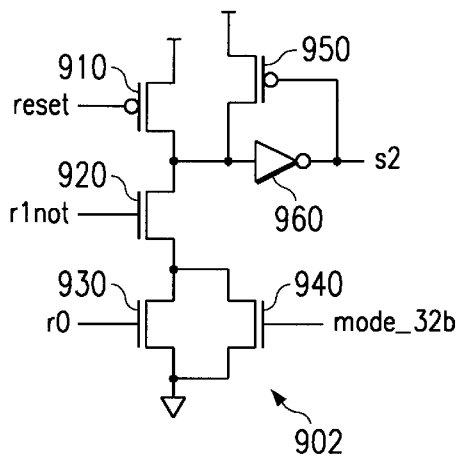

Turning now to FIG. 9C, the circuit 902 that produces select signal S2 is shown. Transistor 910 is gated by a reset signal. Transistor 920 is gated by ^rot_amt(1), transistor 930 is gated by rot_amt(0), and transistor 940 is gated by mode_32b. The output of circuit 902 is select signal S2.

Figure 9D:
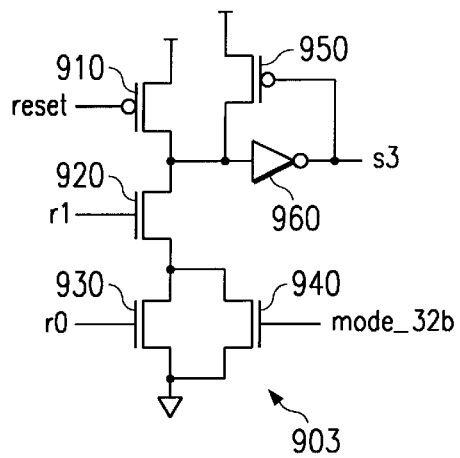

Turning now to FIG. 9D, the circuit 903 that produces select signal S3 is shown. Transistor 910 is gated by a reset signal. Transistor 920 is gated by rot_amt(1), transistor 930 is gated by rot_amt(0), and transistor 940 is gated by mode_32b. The output of circuit 903 is select signal S3.

By placing the logic circuits which control whether 64-bit or 32-bit rotation will be performed on non-critical paths and by having simpler gates on critical paths, 32-bit and 64-bit rotation are performed with increased speed over prior art methods and without increased input load. Other advantages will be obvious to one skilled in the art.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A dual mode rotator, comprising:

a first rotator with a plurality of inputs and outputs;

a second rotator with a plurality of inputs and outputs wherein the outputs of said first rotator are operatively connected to the corresponding inputs of said second rotator; and a third rotator with a plurality inputs and outputs wherein the outputs of said second rotator are operatively connected to the corresponding inputs of said third rotator; wherein responsive to selection of a first rotation mode, the upper half of the inputs to said first rotator are zero and the lower half of the outputs of said third rotator are replicated in the upper half of the outputs of said third rotator.

2. The dual mode rotator as recited in claim 1 wherein, responsive to selection of a second rotation mode, the lower half of the outputs of said third rotator are not replicated into the upper half of the outputs of said third rotator.

3. The dual mode rotator as recited in claim 1 wherein said first rotation mode is 32-bit rotation.

4. The dual mode rotator as recited in claim 1 wherein the second rotation mode is 64-bit rotation.

5. The dual mode rotator as recited in claim 1 wherein said first rotator is a 4:1 dynamic gate multiplexer.

6. The dual mode rotator as recited in claim 1 wherein said second rotator is a 4:1 dynamic gate multiplexer.

7. The dual mode rotator as recited in claim 1 wherein said third rotator is a 4:1 dynamic gate multiplexer.

8. The dual mode rotator as recited in claim 1 wherein the rotation of said third rotator is governed by the equation $$ROT64(i)=(S0 \& ROT16(i))+(S1 \& ROT16(i+16))+(S2 \& ROT16(i+32))+(S3 \& ROT16(i+48))$$

wherein ROT64(i) is the output of said third rotator corresponding to the $i^{th}$ bit of the output where i can be any number between 0 and 63; S0, S1, S2, and S3 are select inputs determining how much rotation and which mode of rotation to be performed by said third rotator; wherein two of said select inputs are low and two of said select inputs are high corresponds to selection of 32-bit rotation; wherein one of said select inputs are high and three of said select inputs are low corresponds to selection of 64-bit rotation; ROT16(i) is the $i^{th}$ output bit from said second rotator; ROT16(i+16) is the $i^{th}$+16 output bit from said second rotator; ROT16(i+32) is the $i^{th}$+32 output bit from said second rotator; and ROT16(i+48) is the $i^{th}$+48 output bit from said second rotator.

9. The dual mode rotator as recited in claim 1 further comprising a plurality of select inputs for said third rotator.

10. A method for rotating bits, the method comprising:

sending a first set of bits to a first set of inputs to a first rotator;

sending a second set of bits to a gate;

responsive to a determination that a first rotation mode is to be performed, sending zeros as the output from said gate to a second set of inputs to said first rotator;

responsive to a rotation amount selection, rotating the inputs to said first rotator by a first amount to generate a first rotated output;

responsive to said rotation amount selection, rotating said first rotated output by a second amount to produce a second rotated output; and responsive to a determination that a first rotation mode is to be performed, rotating said second rotated output by a third amount to produce a third rotated output and replicating a lower registry of said third rotated output into an upper registry of said third rotated output to produce a final rotated output.

11. The method as recited in claim 10, further comprising:

responsive to a determination that a second rotation mode is to be performed, sending said second set of bits as the output of said gate to said second said of inputs for said first rotator; and responsive to a determination that a second rotation mode is to be performed, rotating said second rotated output by a third amount to produce the final rotated output.

12. The method as recited in claim 10 wherein said first rotation mode is 32-bit rotation and said first set of bits comprises 32 separate bits and said second set of bits comprises 32 separate bits.

13. The method as recited in claim 10 wherein said second rotation mode is 64-bit rotation and said first set of bits comprises 32 separate bits and said second set of bits comprises 32 separate bits.

14. The method as recited in claim 10 wherein said first amount is selected from the group of 0, 1, 2, and 3.

15. The method as recited in claim 10 wherein said second amount is selected from the group of 0, 4, 8, and 12.

16. The method as recited in claim 10 wherein said third amount is selected from the group of 0, 16, 32, and 48.

17. A computer processor, comprising:

a sequencer unit;

a load/store unit;

a data cache;

a bus interface unit a fixed point unit;

an instruction cache; and a dual mode rotator; wherein said dual mode rotator has a first rotator with a plurality of inputs and outputs, a second rotator with a plurality of inputs and outputs wherein the outputs of said first rotator are operatively connected to the corresponding inputs of the second rotator, and a third rotator with a plurality of inputs and outputs wherein the outputs of the second rotator are operatively connected to the corresponding inputs of the third rotator, and which rotators exhibit a first rotator mode during which the upper half of the inputs to said first rotator are zero and the lower half of the outputs of said third rotator are replicated in the upper half of the outputs of said third rotator;

said sequencer unit is operatively connected to said load/store unit and is operatively connected to said instruction cache;

said load/store unit is operatively connected to said data cache;

said data cache is operatively connected to said bus interface;

said bus interface unit is operatively connected to said instruction cache;

said fixed point unit is operatively connected to said sequencer unit; and said dual bit rotator is operatively connected to said fixed point unit.

18. The computer processor as recited in claim 17, wherein said dual mode rotator is contained within said fixed point unit.

19. A system for rotating bits, the system comprising:

means for sending a first set of bits the lower input of a first rotator;

means for sending a second set of bits to a gate;

means, responsive to a determination that 32-bit rotation is to be performed, for sending zeros as the output from said gate to the upper input of said first rotator;

means, responsive to a rotation amount selection, for rotating the inputs to said first rotator by a first amount to generate a first rotated output;

means, responsive to said rotation amount selection, for rotating said first rotated output by a second amount to produce a second rotated output; and means, responsive to a determination that a first rotation mode is to be performed, rotating said second rotated output by a third amount to produce a third rotated output and replicating the lower registry of said third rotated output into the upper registry of said third rotated output to produce a final rotated output.

* * * * *